March 2, 1954  
J. H. BERTIN  
2,670,593  
POWER PLANT, INCLUDING A GAS ENGINE AND TURBINE  
Filed Feb. 18, 1948  
4 Sheets-Sheet 1
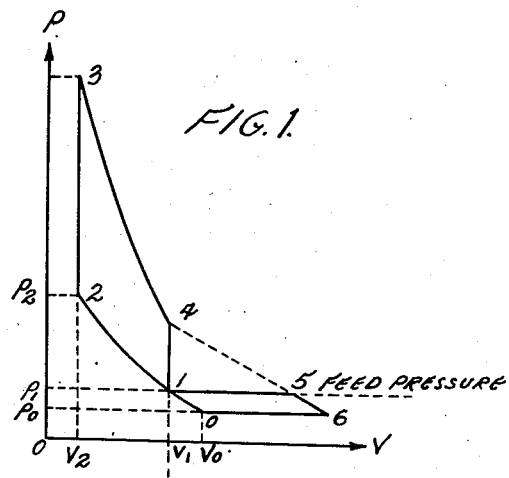
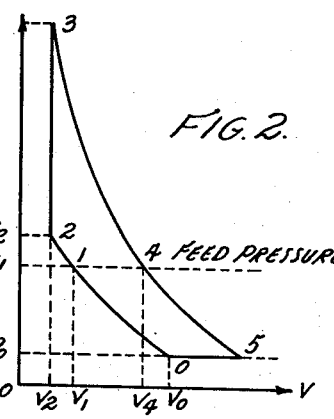
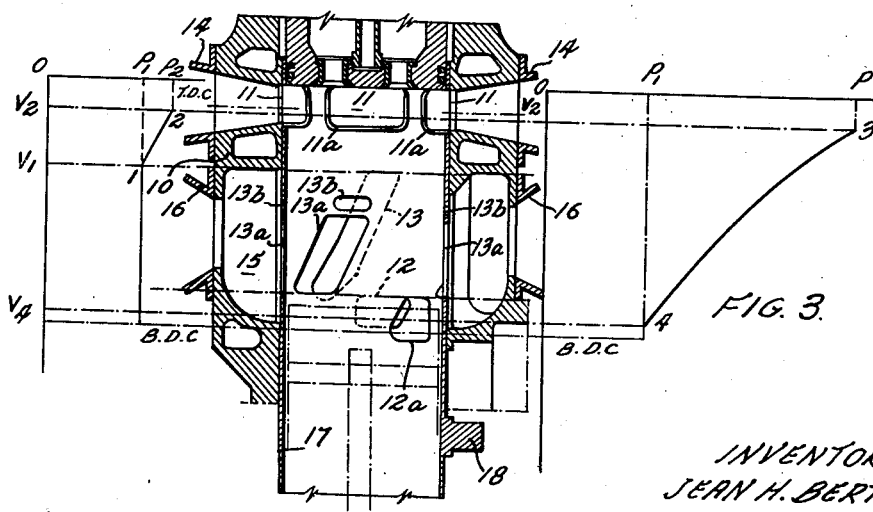
INVENTOR  
JEAN H. BERTIN  
Watson, Cole, Grindle & Watson  
ATTORNEYS March 2, 1954
J. H. BERTIN
2,670,593
POWER PLANT, INCLUDING A GAS ENGINE AND TURBINE
Filed Feb. 18, 1948
4 Sheets-Sheet 2
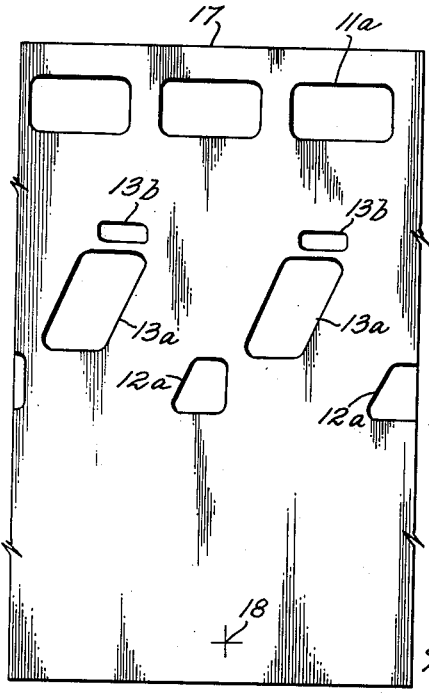
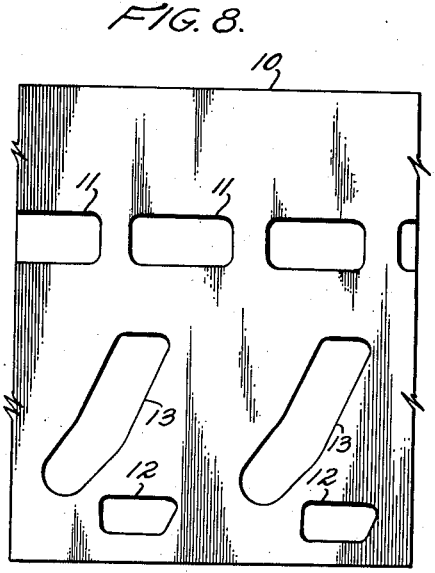
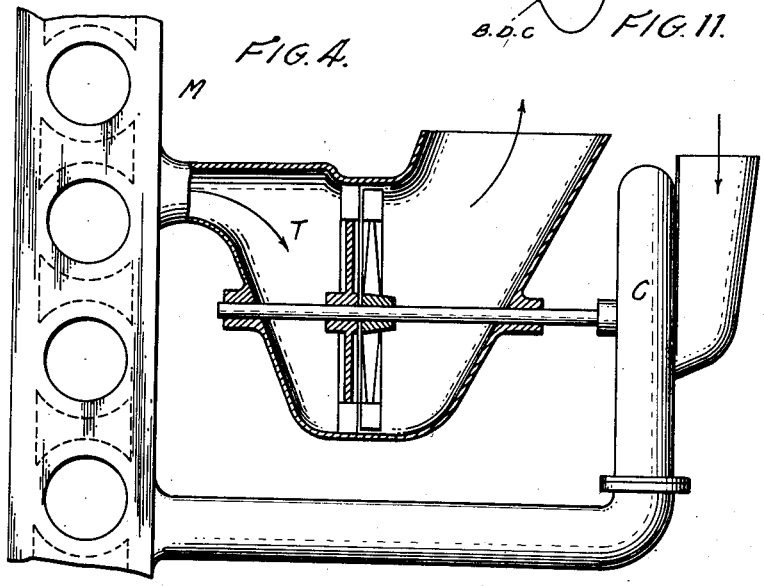

March 2, 1954  J. H. BERTIN  2,670,593
POWER PLANT, INCLUDING A GAS ENGINE AND TURBINE
Filed Feb. 18, 1948  4 Sheets-Sheet 3
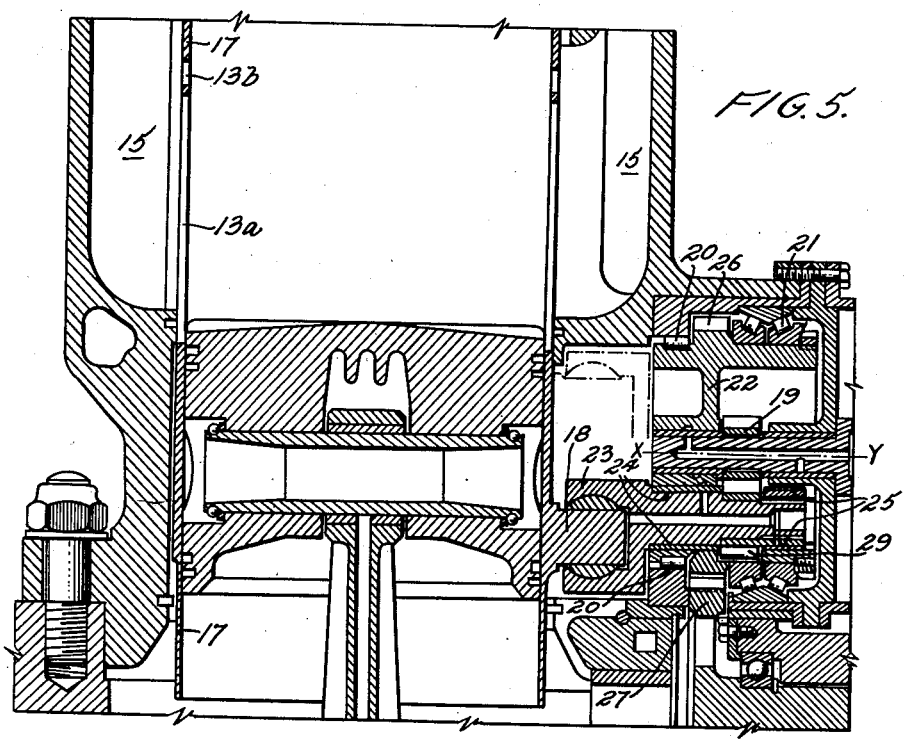
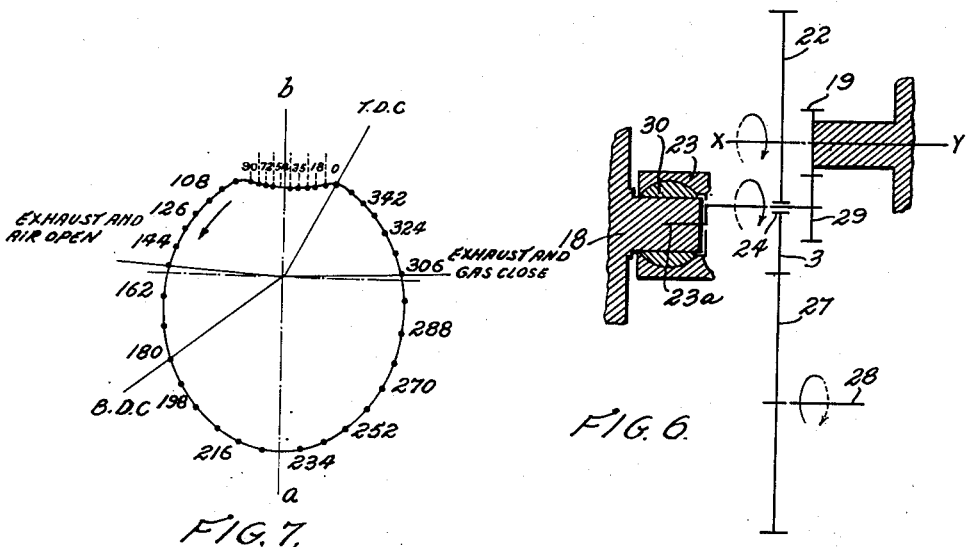
INVENTOR
JEAN H. BERTIN
Watson, Cole, Grindle & Watson
ATTORNEYS

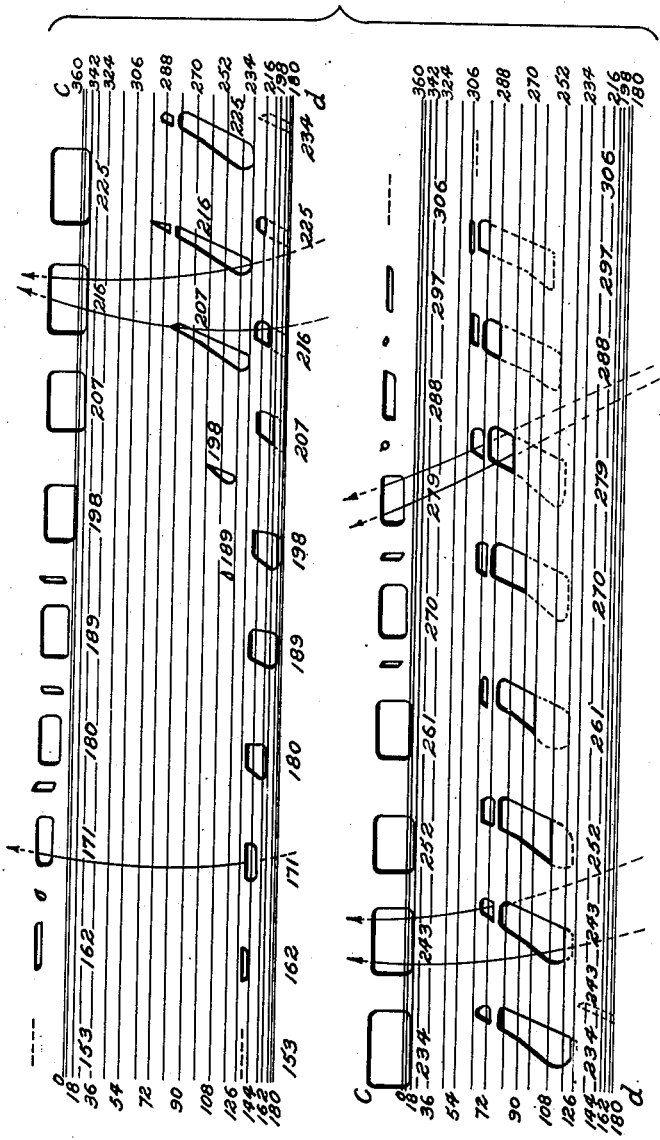

Patented Mar. 2, 1954

2,670,593

UNITED STATES PATENT OFFICE 2,670,593

POWER PLANT, INCLUDING A GAS ENGINE AND TURBINE

Jean H. Bertin, Paris, France, assignor to Societe Nationale d'Etude et de Construction de Moteurs d'Aviation, Paris, France, a company of France Application February 18, 1948, Serial No. 9,255

Claims priority, application France February 27, 1947

6 Claims. (Cl. 60—13)

This invention relates to compound power plants of the type comprising a two-stroke internal combustion piston engine and a turbine or equivalent apparatus in combination, and aims to provide improvements therein.

In power plants of this type, the turbine is supplied with combusted gas issuing from the piston engine and this engine is supplied with scavenging and combustion supporting air under pressure by means of a compressor or supercharger which is usually mechanically coupled with said turbine.

An object of this invention is to provide means for promoting air and gas transfers into and from the piston engine at an increased rate and with reduced pressure loss, whereby the output and efficiency of the improved plant can be substantially increased as compared with conventional plants of the same type. This involves admitting air to and exhausting gas from said engine through ports of relatively large area and controlling said ports by means of a sleeve-valve. This also involves keeping said ports simultaneously open during a relatively long time corresponding to a greater angular displacement of the crank shaft to which the piston is connected than in the case of conventional plants of this type.

A further object of the invention is to provide a compound power plant in which the turbine is operated at substantially constant inlet pressure and in which the motive gas is expanded to approximately atmospheric pressure, the expansion ratio of said turbine (i. e., the ratio between the inlet and outlet pressures) being substantially greater than that of the turbines of conventional compound power plants.

A still further object of the invention is to provide a power plant of this type in which the supercharger is adapted to discharge air at a constant pressure substantially above atmospheric pressure, said constant pressure being at least equal to the inlet pressure to said turbine.

Other objects and advantages of the invention will appear in the following description given with reference to the accompanying drawings in which like numerals are used to designate like parts.

In the drawings,

Figure 1 is a pressure-volume diagram of the gases in conventional two-stroke internal combustion piston engine.

Figure 2 is a similar diagram illustrating the operation of the two-stroke engine according to this invention.

Figure 3 is an axial section of a cylinder of a piston engine according to the invention together with the volume and pressure curves of the cycle illustrated in Figure 2, in correspondence with the positions of the piston in the cylinder.

Figure 4 shows a compound power plant of the type described.

Figure 5 is a partial cross-sectional view, on a larger scale, showing the piston at its bottom dead center, as well as the driving gear associated with the sleeve-valve.

Figure 6 is a diagrammatic view of said gear.

Figure 7 illustrates, on a still larger scale, the flat path described by the crankpin driving the sleeve-valve.

Figures 8 and 9 show respectively a developed portion of the cylinder wall with its exhaust and admission ports and a developed portion of the movable sleeve with its admission and exhaust ports.

Figure 10 is a diagram illustrating the variation of the time cross-sections of the ports, which results from the displacements of the sleeve-valve and piston.

Figure 11 shows the curve in Figure 7 drawn to the scale of Figures 8 and 9.

In the present standard design of internal combustion piston engines, approximate equality is performed between the compression and expansion volumetric ratios, i. e., the ratios of volumes at the beginning and end of the compression and expansion strokes of the piston.

In the diagram of Figure 1 illustrating the operation of a conventional two-stroke engine, in which the pressures P and volumes V are plotted in ordinates and abscissae, the point $1$ corresponds to the closure of the intake ports, the line $2$—$3$ to explosion, and the point $4$ to the opening of the exhaust ports. Hence $V_1:V_2$ represents the compression volumetric ratio and $V_4:V_2$ the expansion volumetric ratio. It will be seen that $V_4$ and $V_1$ are substantially the same, and moreover that the pressure $P_4$ of the gas at the beginning of exhaust, i. e., after it has undergone partial expansion within the cylinder of the engine, is much higher than the intake pressure $P_1$ of scavenging and combustion air. As a rule $$3 < \frac{P_4}{P_1} < 8$$

Furthermore, in the case of a supercharged piston engine, $P_1$ is greater than atmospheric pressure $P_0$ and the ratio $P_4:P_0$ may be as high as 15 or 16.

Hence, if the combusted gas which has incorporated an important fraction (about 40 to 50%) of the total heat energy due to combustion in the cylinders, were expanded down to atmospheric pressure, an important amount of work might have been recovered, which would substantially increase the total efficiency of the engine.

Attempts have been made to recover this amount of work on the shaft of a turbine driven by the effluent from the piston engine. However these attempts have failed in practice for the following main reasons.

The exhaust gas, in the physical state corresponding to point 4 of the diagram, issuing from the cylinder undergoes isentropic expansion and its pressure is converted into velocity, the kinetic energy produced being used for driving the turbine.

However this would be true in practice had the distributor or stationary blading of the turbine been directly mounted on the cylinder wall, which is not possible for structural reasons. Moreover, it should be noted that the pressure $P_4$ is only instantaneous, and that the pressure of the exhaust gas varies continuously by from $P_4$ to $P_0$. Hence the velocity imparted to the gas as it flows through the distributor of the turbine varies considerably from the beginning to the end of exhaust. This implies a further defect due to the fact that the distributor can only be designed for satisfactory operation with a gas in a predetermined physical state, and will not operate properly if the gas is in widely different physical states; this is due to the invariable shape of the stationary blades whereas the gaseous flow is in a variable state condition: for instance, it will be understood that the angular deflection of the gaseous flow due to the shape of the blades will vary according to the velocity of this flow. In brief, on reaching the movable blades of the turbine, the gas has a varying velocity and direction. On the other hand, as the turbine wheel, owing to its inertia, rotates at a constant speed, it will be readily understood that the operative conditions are rather poor and that the efficiency will be quite low.

Furthermore, as regards the operation of the piston engine itself, the pressure of the gaseous mass remaining in the cylinder should reach the minimum delivery pressure, that is $P_1$, before the piston has begun its rising stroke. Otherwise, the work absorbed by the piston for overcoming the resulting counterpressure would correspond to a substantial fraction of the energy recovered in the turbine.

Actually, the theoretical cause of the deficiency can be seen in the diagram of Figure 1 in which the piston engine cycle or high-pressure cycle HPC is indicated by 1—2—3—4 whereas the turbine cycle or low-pressure cycle LPC is indicated by 0—1—5—6. On examining Figure 1, the following features appear:

(a) The turbine operates with a relatively small expansion ratio ($P_1:P_0$) which is not greater than 3 in engines in present use, so that the output of such a turbine can be considered as negligible (at best it can just drive the supercharger);

(b) The amount of energy corresponding to the area 1—4—5 is completely lost (this amounts to about 17% of the total heat energy, about 35% of which would have been theoretically recoverable).

The compound power plant according to the invention is designed to operate according to a modified cycle (see Figure 2) which is almost entirely free from the defects stated with reference to the conventional cycle of Figure 1.

This improved plant includes a supercharger discharging scavenging and combustion air at a same pressure $P_1$ into the cylinder or cylinders of a two-stroke piston engine, and a turbine fed with the effluent from said engine.

Now, it will be seen that the feed pressure $P_1$ is much higher than before: it is actually equal to $P_4$, i. e., the pressure of the partially expanded gas at the beginning of exhaust. Thus the supercharger operates with a compression volumetric ratio $V_0:V_1$ which is substantially greater than in the previous cycle. However, the total compression volumetric ratio $V_0:V_2$ remains the same as it depends on conditions relating on the one hand to the grade of the fuel used in the case of an explosion engine, and on the other hand to mechanical resistance in the case of a diesel engine.

In other words, the same compression of the fluid is distributed differently between the compressor and the pistons of the engine cylinders.

On the contrary, whereas the volumetric compression and expansion ratios $V_1:V_2$ and $V_4:V_2$ were practically equal in the previous case they are now widely different.

The theoretical evolution ends in the turbine in which the gases are supplied at a constant pressure $P_4=P_1$ (which is actually as specified above, the pressure at the beginning of exhaust or maximum exhaust pressure in conventional engines) and are expanded at atmospheric pressure $P_0$. The turbine thus operates with a volumetric expansion ratio $$V_0:V_1=(P_1:P_0)^{1/K}$$

where $K$ is the ratio of the specific heats at constant pressure and at constant volume of the gas.

Hence, not only does the turbine operate under satisfactory conditions, viz. important expansion ratio, constant supply pressure, but also the theoretical available energy corresponds to the area 1—4—5—0 of Figure 2 which is actually that of the turbine or low-pressure cycle LPC and no energy is thereby lost.

Therefore, when comparing Figures 1 and 2, it can be seen that:

(1) The wide difference between the pressure $P_4$ at the beginning of exhaust and the inlet pressure to the turbine is eliminated;

(2) The expansion ratio of the turbine is sufficient for the low-pressure cycle to operate with non-negligible output and efficiency (the same is true as regards the supercharger).

Now these advantages cannot be fully achieved unless admission and exhaust take place in such a way as to allow important transfer into and from the cylinder without entailing undue throttle losses—and moreover this should be carried out within a relatively short time owing to the quick operation of two-stroke engines.

It is therefore necessary to design inlets and outlets having large passage cross sections on the one hand and remaining open as long as possible on the other hand.

These two conditions are fulfilled according to the invention by providing wide and numerous admission and exhaust ports controlled by means of a ported sleeve-valve arranged so that these ports remain simultaneously open during an important fraction of the piston stroke.

In conventional supercharged two-stroke engines, scavenging is performed while the piston is substantially stationary at or near the bottom dead center, which corresponds to a rotation of the crankshaft of about 90°. In the engine according to the invention, air is supplied during a motion of the piston which corresponds to a rotation of the crankshaft of almost 180°.

This feature is clearly indicated in Figure 7 in which the figures represent the angular position in degrees of the crankshaft associated with the piston; TDC and BDC indicate the top dead center and bottom dead center, OEA and CEA the opening and closure of the exhaust and admission ports.

In Figure 3, 10 designates the wall of an engine cylinder, said wall showing at its upper end a series of ports 11 and at its lower end another series of ports 12 and also in its median portion a third series of ports 13 having a more elongated shape than the first two series of ports. These various ports are distributed throughout the periphery of the cylinder. The upper ports 11 serve for exhaust purposes while the ports 12 and 13 serve in cooperation for admission purposes. The scavenging and charging air thus passes through the cylinder in the upward direction corresponding to the direction of motion of the piston, which is an advantageous feature. The system of ports 11 is connected through the cylinder wall to an exhaust manifold 14 leading the gases to the turbine. The admission ports 12, 13 open into an annular manifold 15 connected, through one or more admission pipes 16, with the delivery of the supercharger. The distributing sleeve 17 coaxial with the cylinder is provided similarly: firstly, at its upper end with a first series of ports 11a cooperating with the exhaust ports 11 of the cylinder and, secondly, in its lower portion with a series of ports 12a cooperating with the ports 12 of the cylinder and in its median portion with one or more series of ports 13a, 13b cooperating with the ports 13 of the cylinder.

This sleeve carries laterally, near its lower end, a radial projection 18 by means of which said sleeve is driven under the control of an epicycloidal gear.

A casing 22 is mounted for rotation about the horizontal axis XY of a stationary pinion 19, while suitable bearings 20—21 are inserted between said casing and the stationary gearcase. Said casing 22 carries an eccentric crank 23 adapted to rotate with reference to said casing in the bearings 24 and 25. The casing is provided with a series of teeth 26 meshing with a toothed wheel 27 the shaft 28 of which is driven into rotation by the crankshaft of the engine (Figure 6). In the casing illustrated, the wheel 27 rotates at the same speed as said crankshaft and the pitch circle of its teeth has a diameter equal to that of the pitch circle of the teeth 26 of the casing. To the eccentric crank 23 is keyed a pinion 29 having the same diameter as the stationary pinion 19 and meshing therewith, the spacing between the stationary axis X—Y and the axis of the crank being thus equal to the diameter of the pitch circle of the pinion 19. The crank 23 engages the tenon 18 of the sleeve through the agency of a ball-joint 30 which may slide over said tenon 18 so as to ensure for said sleeve the degree of freedom required for its complex movement.

This control gear mechanism is illustrated diagrammatically in Figure 6; it will be readily apparent that during the rotation of the shaft 28 in synchronism with the crankshaft of the engine, the axis 23a of the tenon 18 describes an epicycloidal movement. The path followed by said axis would be an epicycloid having a single cuspid point in the eccentricity of the axis 23a with reference to the bearing 24 were equal to the radius of the pinions 19 and 29. This eccentricity has, however, a smaller value and therefore the path of the axis 23a assumed the shape illustrated in Figure 7.

The relative angular setting of the different members may be such that the positions of the tenon 18 corresponding to the top dead center TDC and to the bottom dead center BDC may be in alignment with the axis of symmetry $ab$ of said path. But it is preferable to achieve this setting in a manner such that said position of the tenon does not actually lie on the axis $ab$. It is found, as a matter of fact, that if the angular settings of the crankshaft are recorded in degrees along the path of the tenon 18 as shown in Figure 7, a same variation of the angular position of the crankshaft say by 10°, for instance, will correspond to unequal arcs on the path. By shifting with reference to the axis $ab$ the positions of the tenon 18 that correspond to the two dead centers, it is possible to obtain between said two points a larger arc of the path allowing the best possible use of the varying cross-sectional areas of the ports. In addition to this, the opening movements of the ports will thus be provided for these parts of the path in which the arcs are longest, i. e., where the speed of the sleeve is greatest; this allows rapid uncovering of the ports and more particularly of the intake ports registering with the operative surface of the piston.

By tracing the diagram of Figure 9 showing a portion of the ports in the movable sleeve and by superimposing the tracing thus obtained on Figure 8 showing a corresponding portion of the stationary ports, it is possible to obtain the variations in the free cross-sectional areas by shifting the tracing, through a translational movement in a manner such that the tenon 18 follows the path drawn at the scale of Figure 8 on this figure. It is thus possible to obtain for the different positions of the sleeve the free cross-sectional area of the ports as illustrated in Figure 10 showing said variations in two sections to be connected through $cd$. In said Figure 10, the angular positions of the crankshaft are shown in abscissae and in ordinates and the thick horizontal line shows the corresponding location of the upper edge of the piston. It is particularly apparent that the admission is performed at the very edge of the operating surface of the piston.

The exhaust and admission ports open simultaneously at the point marked OEA in Figure 7 for an angle of rotation of the crankshaft of about 150°, the origin O corresponding to the top dead center TDC. The ports are simultaneously closed at the point marked CEA for a crankshaft angle of about 310°. The ports remain thus open simultaneously during a rotation of about 160° and as these ports are numerous and distributed along the whole periphery of the cylinder (Figures 8 and 9 correspond each only to a fraction of the circumference equal say to one half thereof), the cylinder remains open to a great extent during said part of the cycle whereby on the one hand the scavenging of the cylinder by air supplied by the supercharger and fed to the turbine may be perfectly efficient with minimum throttle loss, while on the other hand the filling of the cylinder under the delivery pressure $P_1$ of the supercharger is performed in a perfect manner at the moment CEA of the closure of the ports.

Figure 11 shows diagrammatically an arrangement of a compound power plant of the type described, in which C is the air compressor driven by the turbine T operated with the effluent from the cylinders of the internal combustion engine E.

What I claim is:

1. A compound power plant of the type described comprising a two-stroke internal combustion piston engine in which the gas after combustion undergoes a partial expansion within the cylinder of said engine, the wall of said cylinder being provided with exhaust ports in portions of said wall adjacent the top dead center position of said piston and with admission ports between the exhaust ports and bottom dead center positions of said piston, a ported sleeve valve operable in conjunction with the piston of said engine, operating means connected to said sleeve for simultaneously opening said admission and exhaust ports before said piston has reached its bottom dead center position and for simultaneously closing said admission and exhaust ports when the piston has reached a position over half way towards its top dead center, a supercharger connected to said admission ports and supplying air at a substantially constant pressure greater than the pressure of gases in said cylinder when said ports are opened, and a turbine connected to said exhaust ports and to which said partially expanded gas is transferred and therein expanded to approximate atmospheric pressure.

2. A power plant as set forth in claim 1 wherein the piston is, when the admission and exhaust ports are closed, substantially closer to the top dead center than when said ports are opened.

3. A power plant as set forth in claim 1 in which said operating means moves said sleeve longitudinally of the cylinder and about the axis of said cylinder.

4. A compound power plant of the type described comprising a two-stroke internal combustion piston engine in which the gas after combustion undergoes a partial expansion within the cylinder of said engine, the wall of said cylinder being provided with exhaust ports in portions of said wall adjacent the top dead center position of said piston and with admission ports between the exhaust ports and bottom dead center positions of said piston, a ported sleeve valve operable in conjunction with the piston of said engine, operating means connected to said sleeve for simultaneously opening said admission and exhaust ports before said piston has reached its bottom dead center position and for simultaneously closing said admission and exhaust ports when the piston has reached a position over half way towards its top dead center, a supercharger connected to said admission ports and supplying air at a substantially constant pressure greater than the pressure of gases in said cylinder when said ports are opened, and a turbine connected to said exhaust ports and to which said partially expanded gas is transferred and therein expanded to approximate atmospheric pressure, said turbine being operatively connected to said supercharger.

5. A power plant as set forth in claim 4 wherein the piston is, when the admission and exhaust ports are closed, substantially closer to the top dead center than when said ports are opened.

6. A power plant as set forth in claim 4 in which said operating means moves said sleeve longitudinally of the cylinder and about the axis of said cylinder.

JEAN H. BERTIN.

References Cited in the file of this patent

UNITED STATES PATENTS

| Number | Name | Date |
|---|---|---|
| 1,219,982 | Montbarren et al. | Mar. 20, 1917 |
| 1,253,607 | Knox | Jan. 15, 1918 |
| 1,386,394 | Cage | Aug. 2, 1921 |
| 1,593,571 | Curtis | July 27, 1926 |
| 1,677,305 | Sperry | July 17, 1928 |
| 2,022,841 | Bischof | Dec. 3, 1935 |
| 2,067,288 | Riehm | Jan. 12, 1937 |
| 2,134,285 | Kipfer | Oct. 25, 1938 |
| 2,197,107 | Kammer | Apr. 16, 1940 |
| 2,236,742 | Allyn | Apr. 1, 1941 |
| 2,245,326 | Büchi | June 10, 1941 |
| 2,401,677 | Yingling | June 4, 1946 |
| 2,431,563 | Johansson | Nov. 25, 1947 |

FOREIGN PATENTS

| Number | Country | Date |
|---|---|---|
| 554,283 | France | Feb. 27, 1923 |